United States Patent
Ishida et al.

(10) Patent No.: US 10,608,258 B2
(45) Date of Patent: Mar. 31, 2020

(54) CATALYST FOR SOLID POLYMER FUEL CELLS AND METHOD FOR PRODUCING SAME

(71) Applicant: Tanaka Kikinzoku Kogyo K.K., Tokyo (JP)

(72) Inventors: Minoru Ishida, Hiratsuka (JP); Koichi Matsutani, Hiratsuka (JP)

(73) Assignee: TANAKA KIKINZOKU KOGYO K.K., Tokyo (JP)

( * ) Notice: Subject to any disclaimer, the term of this patent is extended or adjusted under 35 U.S.C. 154(b) by 208 days.

(21) Appl. No.: 14/908,595

(22) PCT Filed: Aug. 1, 2014

(86) PCT No.: PCT/JP2014/070325
§ 371 (c)(1),
(2) Date: Jan. 29, 2016

(87) PCT Pub. No.: WO2015/019953
PCT Pub. Date: Feb. 12, 2015

(65) Prior Publication Data
US 2016/0190602 A1    Jun. 30, 2016

(30) Foreign Application Priority Data

Aug. 8, 2013   (JP) .................................. 2013-164796

(51) Int. Cl.
| H01M 4/86 | (2006.01) |
| H01M 4/92 | (2006.01) |
| H01M 4/90 | (2006.01) |
| B01J 23/89 | (2006.01) |
| B01J 27/02 | (2006.01) |
| B01J 35/00 | (2006.01) |
| H01M 8/1018 | (2016.01) |

(52) U.S. Cl.
CPC ....... *H01M 4/8652* (2013.01); *H01M 4/9041* (2013.01); *H01M 4/9083* (2013.01); *H01M 4/921* (2013.01); *H01M 4/923* (2013.01); *H01M 4/926* (2013.01); *B01J 23/8913* (2013.01); *B01J 27/02* (2013.01); *B01J 35/0033* (2013.01); *H01M 2004/8689* (2013.01); *H01M 2008/1095* (2013.01)

(58) Field of Classification Search
None
See application file for complete search history.

(56) References Cited

U.S. PATENT DOCUMENTS

| 7,220,693 | B1 * | 5/2007 | Qi ...................... H01M 4/8605 429/483 |
| 2004/0109816 | A1 * | 6/2004 | Srinivas ................... C09C 1/56 423/449.2 |
| 2010/0028755 | A1 | 2/2010 | Shiramizu |
| 2013/0035228 | A1 * | 2/2013 | Yamamoto .............. H01M 4/92 502/201 |
| 2017/0149069 | A1 * | 5/2017 | Ishida ................... H01M 4/926 |

FOREIGN PATENT DOCUMENTS

| JP | WO 2004019435 A2 * | 3/2004 | .......... H01M 4/9008 |
| JP | 2004-238311 A | 8/2004 | |
| JP | 2009-070673 A | 4/2009 | |
| JP | 2010-250942 A | 11/2010 | |
| JP | 2011011201 A * | 1/2011 | |
| JP | 2011-226268 A | 11/2011 | |
| JP | 2011-228267 A | 11/2011 | |
| WO | WO 2006-059485 A1 | 6/2006 | |
| WO | WO 2012/095863 A2 | 7/2012 | |

OTHER PUBLICATIONS

Kitano, machine translation of JP2011011201, 66 pages total.*
Ball et al., Enhanced Stability of PtCo Catalysts for PEMFC, ECS Transactions, 1 (8) 141-152 (2006) (Year: 2006).*
Gao et al., Sulfonation of poly(phthalazinones) with fuming sulfuric acid mixtures for proton exchange membrane materials, Journal of Membrane Science 227 (2003) 39-50 (Year: 2003).*
Guo et al., "Enhanced utilization and durability of Pt nanoparticles supported on sulfonated carbon nanotubes", Journal of Power Sources, vol. 255, Jun. 1, 2014, pp. 387-393, https://doi.org/10.1016/j.jpowsour.2014.01.040 (Year: 2014).*
EP, Supplemental European Search Report for EP Application No. 14834719.8, dated Jan. 2, 2017.
JP, International Search Report PCT/JP2014/070325, dated Sep. 2, 2014.

* cited by examiner

*Primary Examiner* — Ula C Ruddock
*Assistant Examiner* — Anna Korovina
(74) *Attorney, Agent, or Firm* — Orrick, Herrington & Sutcliffe LLP; Joseph A. Calvaruso; K. Patrick Herman

(57) ABSTRACT

The present invention aims to provide a catalyst that makes it possible to reduce an amount of solid electrolyte mixed and improve initial performance of a fuel cell, and also a method for producing the catalyst. The present invention relates to a catalyst for a solid polymer fuel cell, which has sulfo groups ($-SO_3H$) on catalyst particles. In TEM-EDX analysis, a ratio ($I_S/I_{Pt}$) of a sulfur peak intensity ($I_S$) to a platinum peak intensity ($I_{Pt}$) on the catalyst particles is within a range of 0.0044 or more and 0.0090 or less. The catalyst makes it possible to reduce the amount of solid electrolyte added and also a fuel cell with excellent initial performance, and thus contributes to a practical use of a fuel cell.

5 Claims, No Drawings

CATALYST FOR SOLID POLYMER FUEL CELLS AND METHOD FOR PRODUCING SAME

TECHNICAL FIELD

The present invention relates to a catalyst for a solid polymer fuel cell. It specifically relates to a catalyst that has proton conductivity, is excellent in terms of the initial activity of a fuel cell, and is suitable for use in a cathode (air electrode), and also to a method for producing the catalyst.

BACKGROUND ART

Fuel cells, particularly solid polymer fuel cells, have advantages in that they operate at low temperatures and are compact, and thus are expected to serve as a power supply for home use and automobiles. A solid polymer fuel cell has a laminate structure including a hydrogen electrode (negative electrode), an air electrode (positive electrode), and a solid (polymer) electrolyte sandwiched between these electrodes. Then, a hydrogen-containing fuel is supplied to the hydrogen electrode, while oxygen or air is supplied to the air electrode, and electric power is extracted by utilization of the oxidation and reduction reactions at the respective electrodes.

Such reactions at the electrodes of a fuel cell are known to proceed at the point of contact (three-phase interface) of a reaction gas, a catalyst (electronic conductor), and a solid electrolyte (proton conductor), and it was believed that the presence of a solid electrolyte as well as a catalyst is indispensable. However, solid electrolytes have problems in that they may degrade due to radical species resulting from the electrode reactions, and also that they are relatively expensive and affect the electrode cost. Thus, the reduction of the amount of solid electrolyte added is demanded.

In a method proposed as a measure for solid electrolyte reduction, proton conductivity is imparted to a catalyst itself, which is an electronic conductor. Specifically, a catalyst for a fuel cell generally having a structure in which precious metal fine particles are supported on a carrier, the catalyst having sulfo groups (—SO$_3$H) introduced into the carrier to impart proton conductivity, is developed. Patent Document 1 discloses a carrier having sulfo groups introduced into a condensed hydrocarbon bearing two or more aromatic rings, and Patent Document 2 discloses a catalyst provided with a sulfated zirconia carrier having sulfo groups supported on the zirconia surface.

RELATED ART DOCUMENT

Patent Documents

Patent Document 1: JP 2004-238311 A
Patent Document 2: JP 2009-70673 A

SUMMARY OF THE INVENTION

Problems to be Solved by the Invention

The above-mentioned conventional art impart proton conductivity to a catalyst itself to achieve solid electrolyte reduction. However, when such a catalyst is applied to a solid polymer fuel cell, and the initial performance of the fuel cell is tested, further improvement of performance is demanded for practical use.

Thus, an object of the present invention is to provide a catalyst that makes it possible to reduce the amount of solid electrolyte mixed and to improve initial performance of a fuel cell. The prevent invention also provides a method for producing the catalyst.

Means for Solving the Problems

As a reason that the initial performance is not necessarily sufficient in the conventional art that imparts proton conductivity to a catalyst itself, the present inventors considered that sulfo groups introduced onto the carrier are not necessarily efficiently involved in proton conduction depending on their placement conditions. Focusing attention on the fact that electrode reactions proceed at the point where a reaction gas, an electronic conductor (catalyst), and a proton conductor (solid electrolyte) come close to each other as mentioned above, the present inventors considered that only sulfo groups placed near catalyst particles, particularly those containing a precious metal, are likely to be involved in proton conductivity, and thus arrived at the present invention.

Namely, the present invention relates to a catalyst for a solid polymer fuel cell, including catalyst particles containing platinum and cobalt supported on a carbon powder carrier, the catalyst having sulfo groups (—SO$_3$H) at least on the catalyst particles, in TEM-EDX analysis, the ratio ($I_S/I_{Pt}$) of the sulfur peak intensity ($I_S$) to the platinum peak intensity ($I_{Pt}$) on the catalyst particles being within a range of 0.0044 or more and 0.0090 or less.

In the catalyst for a fuel cell of the present invention, the amount of sulfo groups placed on the catalyst particles is within the range with reference to the sulfur peak intensity determined by TEM-EDX analysis. Like this, by EDX (energy dispersion X-ray) analysis, of sulfo groups introduced into the catalyst, only the amount of those placed on the catalyst particles containing platinum and cobalt is specified. When such a catalyst of the present invention is applied to a solid polymer fuel cell, the initial performance can be improved while the amount of solid electrolyte added is reduced.

When the sulfur peak intensity ($I_S$) determined by TEM-EDX analysis is used as a reference, in the present invention, evaluation is made based on the ratio ($I_S/I_{Pt}$) of $I_S$ to the platinum peak intensity ($I_{Pt}$). This is to eliminate analysis errors originating from the sensitivity of an individual analyzer contained in the sulfur peak intensity values detected by EDX analysis. This is based on the idea that in EDX analysis, when the same sample is measured, analysis errors originating from the device do not change.

When the peak intensity ratio ($I_S/I_{Pt}$) is less than 0.0044, in the case where the catalyst is applied to a fuel cell, the initial performance is unlikely to improve, when it is 0.0044 or more and 0.0090 or less, the initial performance is likely to improve, and when it is more than 0.0090, the performance tends to decrease. As mentioned above, focusing attention on the improvement of initial performance, there is an upper limit on the suitable amount of sulfo groups introduced. This is assumed to be because excessive sulfo groups may inhibit the electronic conduction by catalyst particles.

In the present invention, characteristic X-rays were detected by EDX analysis to perform elemental analysis based on the obtained energy intensities. Specifically, the sulfur peak intensity ($I_S$) was measured from the energy intensity of Kα ray near 2.307 keV, while the platinum peak intensity ($I_{Pt}$) was measured from the energy intensity of Mα ray at 2.0485 keV. The Kα ray is a characteristic X-ray generated when electron transition occurs from L-orbit to K-orbit in the electron orbitals of constituent atoms of the sample, while the Mα ray is a characteristic X-ray generated when electron transition occurs from N-orbit to M-orbit. As a result of the actual EDX analysis performed by the present inventors, the sulfur peak intensity measured above contained an overlapping portion derived from the spectrum of Pt, which is a catalyst metal. Thus, the sulfur peak intensity was calculated by subtracting the waveform of the separately measured standard spectrum of Pt from the measured value of the energy intensity near 2.307 keV.

In the catalyst for a fuel cell of the present invention, a carbon powder and platinum-cobalt alloy particles may be applied as a carrier and a catalyst metal, respectively. The catalyst metal and carrier are not particularly limited in structure. However, a case where the initial performance when applied to a fuel cell is considered, the following ranges will be preferable. For the catalyst metal, the structural (molar) ratio of platinum to cobalt Pt/Co is preferably 3/2 or more and 3/1 or less, and the platinum-cobalt particles preferably have an average particle size of 2 nm or more and 30 nm or less. Additionally, the carbon powder as a carrier preferably has a specific surface area of 100 $m^2/g$ or more and 1000 $m^2/g$ or less.

As described above, the present invention specifies the amount of sulfo groups (sulfur) introduced onto the catalyst particles. However, the present inventors considered that the amount of sulfo groups placed on the carrier should also be examined. As described above, when the initial performance of a fuel cell is considered, there is an upper limit on the suitable amount of sulfo groups introduced. Therefore, it is effective that sulfo groups are introduced into a desirable position as much as possible. Specifically, supposedly, introduced sulfo groups are preferably placed in a greater amount on the catalyst particles than on the carrier excluding the vicinity of the catalyst particles.

Accordingly, the catalyst of the present invention preferably has sulfo groups on the catalyst particles and the carbon powder carrier, and on which the appearance rates of sulfur peaks based on the results of TEM-EDX analysis at five or more measurement points (the number of sulfur peaks appeared/the total number of measurements×100) are 55% or more on the catalyst particles ($X_{PtCo}$) and 30% or less on the carbon powder carrier (XC), respectively. The appearance rate of sulfur peaks on the catalyst particles ($X_{PtCo}$) is more preferably 80% or more, and the carbon powder carrier ($X_C$) 29% or less.

Like this, when not only the amount of sulfur on the catalyst particles but also that on the carbon powder carrier excluding the vicinity of the catalyst particles is considered, such a catalyst is likely to provide a fuel cell with excellent initial performance. Here, from the gist, the sulfur-derived peak appearance rate "on the carbon powder carrier" ($X_C$) is to be understood as "excluding the vicinity of the catalyst particles", specifically values measured on the carbon powder carrier 10 nm or more away from the end of the catalyst particles.

The reason that the amount is specified by "the appearance rate of sulfur peaks" rather than the sulfur peak intensity is to focus attention only on the presence or absence of elemental sulfur as an index to determine where in the catalyst sulfur (sulfo group) is mostly present. For sulfur peaks in the present invention, when the peak intensity is 100 or more, elemental sulfur is assumed to be present on the measurement position, while when the intensity is less than 100, it is judged that there is no sulfur. The appearance rate of sulfur peaks is calculated as the proportion (%) of the number of samples judged as having sulfur based on the total number of samples measured. The number of measurement points for peak intensity measurement is 5 or more, preferably 7 or more.

Additionally, the ratio ($X_{PtCo}/X_C$) of the appearance rate of sulfur peaks on the catalyst particles ($X_{PtCo}$) to the appearance rate of sulfur peaks on the carbon powder carrier ($X_C$) is preferably 2.5 or more, more preferably 3.0 or more. When $X_{PtCo}/X_C$ is 2.5 or more, in the case where the catalyst is applied to a fuel cell, the initial performance tends to easily improve. This is considered to be because when sulfo groups are introduced onto the carbon powder carrier in a proper amount relative to the amount on the catalyst particles, the electrical conductivity of the carbon carrier effectively functions in the fuel cell reactions.

As a method for producing the catalyst for a solid polymer fuel cell described above, a method including a step of immersing a catalyst including catalyst particles containing platinum and cobalt supported on a carbon powder carrier in a mixed solution containing concentrated sulfuric acid and fuming sulfuric acid, the temperature of the mixed solution being 40° C. or more and 90° C. or less, can be applied.

Conventionally, as a method for introducing sulfo groups into a catalyst carrier, a method in which the carrier is heated in a solution of either concentrated sulfuric acid or fuming sulfuric acid has been known. However, in the conventional method, sulfo groups are only introduced onto a carrier supporting no catalyst particles. Such conventional methods cannot be simply applied for the production of the catalyst of the present invention having a predetermined amount of sulfo groups on catalyst particles. For this reason, the present inventors conducted extensive research, and found that in the case where sulfo groups are introduced into a catalyst having catalyst particles supported (sulfonation), when a solution containing both concentrated sulfuric acid and fuming sulfuric acid is used, and the temperature of the solution is within a predetermined range, a catalyst having the amount of sulfo groups (sulfur) on the catalyst particles can be produced, and thus arrived at the method of the present invention. Hereinafter, the production method of the present invention will be described step by step.

To obtain a catalyst before sulfonation (untreated catalyst) having catalyst particles supported on a carrier, a general production method, such as a method in which a carbon fine powder as a catalyst is immersed in a solution containing a platinum salt and a cobalt salt, then heated, and stirred to support the catalyst particles, can be employed. Additionally, a commercially available PtCo/Carbon catalyst can be used to perform the following sulfonation.

The untreated catalyst is immersed in the following chemical liquid to introduce sulfo groups (sulfonation). The chemical liquid used for sulfonation contains both concentrated sulfuric acid and fuming sulfuric acid. Use of such a chemical liquid is likely to give a catalyst in which the amount of sulfo groups introduced onto the catalyst particles is such that the sulfur peak intensity, the platinum peak intensity, and the ratio are within the ranges. Concentrated sulfuric acid refers to sulfuric acid having a purity of 90 wt % more, preferably a purity of 95%, and still more preferably a purity of 96%. As fuming sulfuric acid, its $SO_3$ content is preferably 15 vol % or more and 30 vol % or less. With respect to the mixing ratio (volume ratio) between concentrated sulfuric acid and fuming sulfuric acid, concentrated sulfuric acid/fuming sulfuric acid is preferably 0.7 or more and 4.0 or less, still more preferably 1.0 or more and 2.0 or less. The amount of chemical liquid is preferably 10 ml or more and 20 ml or less per 1 g of the catalyst.

Additionally, in the production method of the present invention, the solution temperature at the time of sulfonation is 40° C. or more and 90° C. or less. In the conventional method, in which sulfo groups are introduced into a carrier, the solution temperature at the time of sulfonation is relatively high (100° C. or more). When increase of the amount of sulfo groups introduced is considered, a potential measure will be setting the treatment temperature at high as much as possible like the conventional method. In contrast, in the catalyst of the present invention, as mentioned above, the amount of sulfo groups introduced is made within a proper range to provide a catalyst that achieves high initial performance when applied to a fuel cell. Thus, the amount of sulfo groups introduced is not simply the more the better. Thus, in the production method of the present invention, there is an upper limit on the solution temperature at the time of sulfonation. When the temperature is lower than 40° C., sulfo groups is hardly sufficiently introduced, while when it is higher than 90° C., in the case where the sulfonated catalyst is applied to a fuel cell, high initial performance is hardly to be achieved. The treatment time for sulfonation is preferably 8 h or more and 24 h or less. When the time is less than 8 h, sulfo groups is hardly sufficiently introduced, while even when the treatment is performed for more than 24 h, the amount of sulfo groups introduced hardly increases, and also the initial performance when applied to a fuel cell is difficult to improve.

Advantageous Effects of the Invention

According to the catalyst for a solid polymer fuel cell of the present invention, a catalyst with high initial performance when applied to a fuel cell, while the amount of solid electrolyte added is reduced, can be achieved.

DESCRIPTION OF EMBODIMENTS

Hereinafter, best embodiments of the present invention will be described.
First Embodiment: Sulfo groups were introduced into a catalyst (sulfonation) under various conditions, and the obtained sulfonated catalyst was subjected to functional group analysis, sulfur analysis, and an initial performance test.
[Sulfonation of Catalyst]
3 g of a commercially available PtCo/Carbon catalyst (TEC36F52HT2, manufactured by Tanaka Kikinzoku Kogyo K.K.) was immersed in 30 ml of concentrated sulfuric acid having a purity of 96 wt % and 30 ml of fuming sulfuric acid having an $SO_3$ content of 25 vol %, and stirred for 8 hours at a liquid temperature of 40° C. to cause sulfonation. In this PtCo/Carbon catalyst, Pt:Co=2.2:1, the average particle size of the platinum-cobalt particles is 4.2 nm, and the specific surface area of the carbon powder is 800 $m^2/g$. After sulfonation, the catalyst was filtered, immersed in 4 L of ion exchange water at 70° C., stirred for 30 minutes, filtered again to perform a washing step, and unreacted sulfuric acid and fuming sulfuric acid were removed. The washing step was repeatedly performed until the washing water became neutral. After washing, the mixture was dried in air at 60° C. overnight and then ground in a mortar to give a sulfonated catalyst. Such a sulfonated catalyst was subjected to the following various analyses. Additionally, catalysts sulfonated with chemical liquids and heating under the conditions shown in Table 1 were also analyzed in the same manner.
[Strongly Acidic Functional Groups]
The obtained sulfonated catalysts were subjected to the quantification of strongly acidic functional groups, such as sulfo groups (—$SO_3H$) and carboxyl groups (—COOH), by a titration method. 55 ml of ion exchange water was added to 0.25 g of each sulfonated catalyst in terms of carbon (about 0.5 g), stirred for 10 minutes, and then ultrasonically dispersed for 2 minutes. The catalyst dispersion liquid was filtered, then the filtrate was transferred to a glove box purged with nitrogen gas, and the filtrate was bubbled with nitrogen gas for 10 minutes. For titration, after adding an excess of a 0.1 mol/L aqueous sodium hydrogen carbonate solution, neutralization titration was performed with 0.1 mol/L hydrochloric acid, and the amount of functional groups was quantified from the neutralization point. This is because the acid dissociation constant (pKa) of carbonic acid is 6, and sodium hydrogen carbonate reacts with a strongly acidic functional group having a pKa of less than 6. From the amount of bases added in this titration and the amount of hydrochloric acid consumed, the amount of strongly acidic functional groups on the catalyst surface was calculated. The neutralization point was checked with a pH meter, and pH 4.5 was defined as the neutralization point.
[Sulfur Analysis]
The amount of sulfur (ppm) in a sulfonated catalyst was measured with an automatic halogen-sulfur analysis system (SQ-10 electric furnace and HSU-35 absorption unit, manufactured by Yanaco LID Co., LTD) and ion chromatography (manufactured by DKK-TOA). In an electric furnace, while air is circulated at a flow rate of 2.2 l/min, 0.05 g of a sulfonated catalyst was retained for 5 minutes at normal pressure and a temperature raised from 450° C. to 750° C., and then retained for 5 minutes at a temperature raised to 900° C. Combustion decomposition gas containing a sulfur component (sulfur dioxide, $SO_2$) generated during the combustion process was dissolved and collected in a hydrogen peroxide solution, and sulfate ions ($SO_4^{2-}$) were separated and quantified by ion chromatography. From the value of sulfur concentration (ppm) measured, the molar amount of sulfo groups in terms of sulfo groups (—$SO_3H$) per 1 g of the catalyst was calculated (mmol/g-catalyst).
[Initial Performance Test]
The catalysts of examples and comparative examples were subjected to a fuel cell initial performance test. This performance test was performed by measuring the mass activity. In the experiment, a single cell was used, and a membrane/electrode assembly (MEA) containing a proton-conducting polymer electrolyte membrane sandwiched between cathode and anode electrodes each having an electrode area of 5 cm×5 cm=25 $cm^2$ was produced and evaluated. As a pretreatment, a current/voltage curve was prepared at a hydrogen flow rate of 1000 mL/min, a cell temperature of 80° C., an anode humidification temperature of 90° C., and a cathode humidification temperature of 30° C. Subsequently, the mass activity was measured as the main measurement. The test method was as follows: the current value (A) at 0.9 V was measured, and, from the weight of Pt applied onto the electrodes, the current value per 1 g of Pt (A/g-Pt) was determined to calculate the mass activity. The initial performance shown in Table 1 is the mass activity calculated above relative to that of a non-sulfonated catalyst (test No. 1-6) (=1.00).

TABLE 1

| Test No. | Chemical liquid | | Heating conditions | | Strongly acidic functional groups mmol/g-carbon | Molar amount of sulfo groups mmol/g-cat | Initial performance A/g-Pt |
|---|---|---|---|---|---|---|---|
| | Concentrated sulfuric acid mL | Fuming sulfuric acid mL | Temperature °C | Time h | | | |
| 1-1 | 30 | 30 | 40 | 8 | 0.49 | 0.124 | 1.36 |
| 1-2 | | | 90 | | 0.76 | 0.141 | 1.28 |
| 1-3 | | | 110 | | 0.64 | 0.177 | 1.03 |
| 1-4 | 60 | 0 | 90 | 8 | 0.54 | 0.069 | 1.18 |
| 1-5 | 0 | 60 | | | 0.74 | 0.214 | 1.02 |
| 1-6 | | Not sulfonated | | | 0.36 | 0.004 | 1.00 |
| 1-7 | 30 | 30 | 90 | 24 | 0.63 | 0.112 | 1.26 |

From Table 1, as compared with the non-sulfonated catalyst (test No. 1-6), in the catalysts sulfonated at 40° C. or more and 90° C. or less by use of concentrated sulfuric acid and fuming sulfuric acid as a chemical liquid, the initial performance improved. In contrast, in the catalyst sulfonated with only fuming sulfuric acid (test No. 1-5), although the amounts of strongly acidic functional groups and sulfur increased as a result of sulfonation, the initial performance hardly increased as compared with that before sulfonation.
Second Embodiment: The catalysts sulfonated in the first embodiment were subjected to TEM-EDX analysis to check the position and amount of sulfo groups introduced.
[TEM-EDX Analysis]
The sulfonated catalysts were each observed under TEM (transmission electron microscope, Cs-corrected STEM device, Model No. JEM-ARM 200F, manufactured by JEOL Ltd.) under the following conditions: accelerating voltage: 80 kV, STEM beam diameter: less than 0.2 nm, analysis area: a circular area of about 2 nm ϕ. For arbitrary seven points on the catalyst particles (Pt—Co), the peak intensity was measured for an integration time of 60 seconds with an SDD detector manufactured by JEOL Ltd. and an EDX (energy dispersive X-ray analysis) device of a system analyzer Noran System 7 manufactured by Thermo Fisher Scientific Inc.
Of the measured EDX data, sulfur peak intensities (near 2.307 keV) were subjected to the following analyses (1) and (2) to eliminate the Pt-derived overlapping portion contained in the measured values.
(1) Seven points on catalyst particles of a non-sulfonated catalyst (Pt/carbon catalyst, manufactured by Tanaka Kikinzoku Kogyo K.K., trade name: TEC10E50E) were subjected to EDX analysis, and the obtained spectra were each defined as a Pt standard spectrum. For the measurement of the Pt standard spectra, a catalyst in which catalyst particles have the same level of average particle size as in sulfonated catalysts was used.

(2) Seven points on catalyst particles of a sulfonated catalyst were subjected to EDX analysis. For each obtained spectrum, the difference in waveform from the Pt standard spectrum of (1) was calculated for every measurement point to determine the sulfur peak intensity (S—Kα intensity).

For the calculated sulfur peak intensities (S—Kα intensities) and also the platinum peak intensities (near 2.0485 keV) actually measured by EDX, the averages ($I_S$, $I_{Pt}$) of the seven measurement points were calculated. Additionally, the sulfur peak intensity at each measurement point was divided by the average platinum peak intensity ($I_{Pt}$) to calculate the peak intensity ratio at each measurement point. For the intensity ratios, the average of the seven points was calculated to determine the peak intensity ratio ($I_S/I_{Pt}$).

TABLE 2

| Test No. | Peak intensity | | Intensity ratio | Strongly acidic functional groups | Molar amount of sulfo groups | Initial performance |
|---|---|---|---|---|---|---|
| | $I_s$ | $I_{Pt}$ | $I_s/I_{Pt}$ | mmol/g-carbon | mmol/g-cat | A/g-Pt |
| 1-1 | 179 | 37620 | 0.0056 | 0.49 | 0.124 | 1.36 |
| 1-2 | 184 | 47923 | 0.0067 | 0.76 | 0.141 | 1.28 |
| 1-3 | 224 | 45794 | 0.0098 | 0.64 | 0.177 | 1.03 |
| 1-4 | 85 | 49764 | 0.0040 | 0.54 | 0.069 | 1.18 |
| 1-5 | 339 | 35828 | 0.0095 | 0.74 | 0.214 | 1.02 |
| 1-6 | 62 | 34655 | 0.0042 | 0.36 | 0.004 | 1.00 |
| 1-7 | 129 | 51899 | 0.0044 | 0.63 | 0.112 | 1.26 |

Table 2 shows that when the ratio ($I_S/I_{Pt}$) of the sulfur peak intensity ($I_S$) to the platinum peak intensity ($I_{Pt}$) on the catalyst particles is 0.0044 or more, such a catalyst provides a fuel cell with high initial performance, while when the ratio is more than 0.009, the initial performance tends to decrease.

Additionally, the appearance rate of sulfur peaks was calculated from the EDX analysis. To determine the appearance rates of sulfur peaks ($X_{PtCo}$, $X_C$), sulfur peak intensities on catalyst particles (arbitrary six or seven points) were measured in the same manner as above, and also sulfur peak intensities at arbitrary six or seven points on a carbon powder carrier 10 nm or more away from the end of the catalyst particles were measured. When the measured sulfur peak intensity value was 100 or more, such a sample was defined as having a sulfur peak, and the proportion (%) of the number of samples having a sulfur peak based on the total number of measurements (six or seven points) was calculated (Table 3).

TABLE 3

|  | No. 1-1 | | No. 1-2 | | No. 1-3 | | No. 1-4 | | No. 1-5 | | No. 1-6 | | No. 1-7 | |
| --- | --- | --- | --- | --- | --- | --- | --- | --- | --- | --- | --- | --- | --- | --- |
|  | PtCo | C | PtCo | C | PtCo | C | PtCo | C | PtCo | C | PtCo | C | PtCo | C |
| Peak intensity | 211 | 40 | 0 | 18 | 631 | 32 | 0 | 6 | 375 | 224 | 0 | 18 | 0 | 0 |
|  | 352 | 517 | 0 | 170 | 0 | 0 | 0 | 14 | 544 | 260 | 0 | 70 | 70 | 0 |
|  | 191 | 61 | 256 | 16 | 447 | 41 | 0 | 32 | 471 | 123 | 214 | 27 | 0 | 45 |
|  | 182 | 20 | 433 | 0 | 0 | 24 | 0 | 0 | 86 | 56 | 0 | 11 | 281 | 0 |
|  | 113 | 79 | 288 | 97 | 0 | 62 | 181 | 0 | 303 | 32 | 193 | 0 | 146 | 62 |
|  | 0 | 34 | 308 | 59 | 267 | 31 | 120 | 80 | 406 | 248 | 26 | 14 | 180 | 113 |
|  | 204 | 303 | 0 | 48 | — | — | 292 | 22 | 186 | 270 | 0 | 0 | 228 | 55 |
| Sulfur peak appearance rate (%) | $X_{PtCo}$ 85.7 | $X_c$ 28.6 | $X_{PtCo}$ 57.1 | $X_c$ 14.3 | $X_{PtCo}$ 50.0 | $X_c$ 0 | $X_{PtCo}$ 42.9 | $X_c$ 0 | $X_{PtCo}$ 85.7 | $X_c$ 71.4 | $X_{PtCo}$ 28.6 | $X_c$ 0 | $X_{PtCo}$ 57.1 | $X_c$ 14.3 |
| $X_{PtCo}/X_c$ | 3.0 | | 4.0 | | 0 | | — | | 1.2 | | — | | 4.0 | |
| Initial performance (A/g-Pt) | 1.36 | | 1.28 | | 1.03 | | 1.18 | | 1.02 | | 1.00 | | 1.26 | |

From Table 3, when the appearance rate of sulfur peaks on the catalyst particles ($X_{PtCo}$) was 55% or more, and that on the carrier ($X_C$) was 30% or less, the initial performance was high. Additionally, the initial activity was high when $X_{PtCo}/X_C$ was 2.5 or more.

Third Embodiment: For sulfonated catalysts obtained in the first embodiment, a solid electrolyte was added at various mixing ratios, and the fuel cell initial performance was measured.

As the solid electrolyte, a powder of Nafion (manufactured by Du Pont: registered trademark) was added to a sulfonated catalyst (test No. 1-1) and a non-sulfonated catalyst (test No. 1-6) of the first embodiment such that the Nafion/Carbon weight ratio would be as shown in Table 4, and the initial performance test was evaluated. The initial performance test was performed in the same manner as in the first embodiment.

TABLE 4

| Test No. | Mixing ratio Nafion/Carbon | Initial performance A/g-Pt | | Performance improvement rate(No. 1-1)/(No. 1-6) |
| --- | --- | --- | --- | --- |
| | | No. 1-6 | No. 1-1 | |
| 2-1 | 0.6 | 29 | 33 | 1.14 |
| 2-2 | 0.8 | 46 | 56 | 1.22 |
| 2-3 | 1.0 | 61 | 83 | 1.36 |
| 2-4 | 1.2 | 67 | 83 | 1.24 |

Table 4 shows that the initial performance of the sulfonated catalyst (test No. 1-1) was improved as compared with the non-sulfonated catalyst (test No. 1-6), and high initial performance can be achieved even when the mixing ratio of a solid electrolyte is reduced.

INDUSTRIAL APPLICABILITY

The catalyst for a solid polymer fuel cell of the present invention makes it possible to reduce of the amount of solid electrolyte added to reduce the cost of fuel cell electrodes, provides a fuel cell with excellent initial performance, and contributes to the practical use of a fuel cell.

The invention claimed is:

1. A catalyst for a solid polymer fuel cell, comprising catalyst particles containing platinum and cobalt supported on a carbon powder carrier,
   the catalyst having sulfo groups (—$SO_3H$) directly on the catalyst particles and directly on the carbon powder carrier,
   wherein an amount of the sulfo groups on the catalyst particles exceeds an amount of the sulfo groups on the carbon powder carrier.

2. A method for producing the catalyst for the solid polymer fuel cell defined in claim 1, wherein the method comprises a step of immersing the catalyst including the catalyst particles containing the platinum and the cobalt supported on the carbon powder carrier in a mixed solution containing concentrated sulfuric acid and fuming sulfuric acid, a mixing ratio between the concentrated sulfuric acid and the fuming sulfuric acid in the mixed solution in the form of the concentrated sulfuric acid/the fuming sulfuric acid is 1.0 or more and 2.0 or less, a temperature of the mixed solution is 40° C. or higher and 90° C. or lower, and a treatment time by the mixed solution is 8 h or more and 24 h or less.

3. The method for producing the catalyst for the solid polymer fuel cell defined in claim 2, wherein an amount of the mixed solution is 10 ml or more and 20 ml or less per gram of the catalyst.

4. The catalyst for the solid polymer fuel cell according to claim 1, wherein in a TEM EDX analysis, a ratio ($I_S/I_{Pt}$) of a sulfur peak intensity ($I_S$) to a platinum peak intensity ($I_{Pt}$) on the catalyst particles being within a range of 0.0044 or more and 0.0090 or less, and on the catalyst particles and on the carbon powder carrier, appearance rates of sulfur peaks based on results of TEM-EDX analysis at five or more measurement points (a number of sulfur peaks appeared/a total number of measurements ×100) are 55% or more on the catalyst particles ($X_{PtCo}$) and 30% or less on the carbon powder carrier ($X_C$), respectively.

5. The catalyst for the solid polymer fuel cell according to claim 4, wherein a ratio ($X_{PtCo}/X_C$) of the appearance rates of sulfur peaks on the catalyst particles ($X_{PtCo}$) to the appearance rates of sulfur peaks on the carbon powder carrier ($X_C$) is 2.5 or more.

* * * * *